Oct. 27, 1953     R. W. BOYD, JR     2,657,066
TOOL HOLDING COLLET FOR BORING BAR ASSEMBLIES
Filed Dec. 22, 1950
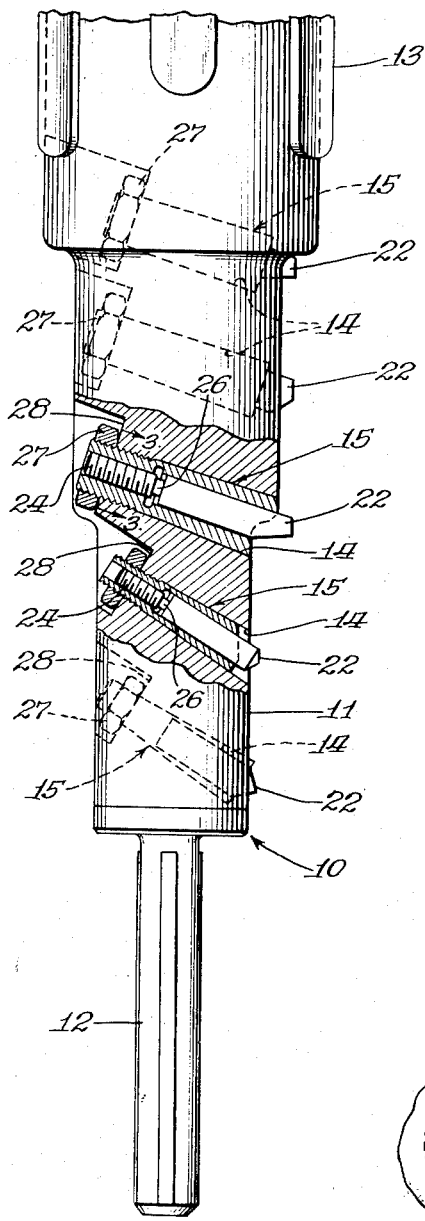
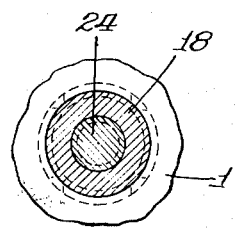
Inventor:
Roy W. Boyd Jr.
Atty.

Patented Oct. 27, 1953

2,657,066

UNITED STATES PATENT OFFICE 2,657,066

TOOL HOLDING COLLET FOR BORING BAR ASSEMBLIES

Roy W. Boyd, Jr., Chicago, Ill.

Application December 22, 1950, Serial No. 202,322

1 Claim. (Cl. 279—46)

This invention relates to a boring bar and more particularly to a tool holder for a boring bar assembly.

The boring bar with which the present invention is concerned may be termed a multiple boring bar assembly. In the conventional construction this type of boring bar contains a number of bores in which tool holding collets are positioned. Provisions are generally made for removing the collets so that the tools may be removed from the collet for sharpening. Various adjusting devices have been provided on conventional boring bars, these adjustments being intended to permit the tool to be adjusted for compensating for wear of the cutting point. It is a prime object of this invention to provide an improved type of boring bar assembly, the assembly including a novel tool holding collet which will permit the operator to make ready and quick adjustments whenever necessary.

Still another object is to provide a collet for holding a cutting tool, the collet having provisions whereby the cutting tool may be adjusted relative to the collet with a minimum effort on the part of the operator.

Still another object is to provide a tool holding collet having a body portion provided with an outwardly threaded shank portion. The body is longitudinally slotted to provide a plurality of resilient fingers. The outer surface of the fingers define a tapered or conical surface which may be readily inserted into the conical bore of a boring bar. A nut which is threaded over the threaded portion of the shank is adapted to engage the body of a boring bar in order to advance the collet longitudinally with respect to the tapered bore to effect inward clamping action of the resilient collet fingers which will rigidly clamp a cutting tool held between said fingers. The shank portion of the collet is provided with a threaded bore in which a thrust member or plug is threaded. The plug is adjustable within the threaded bore and is adapted to engage the cutting tool held between the resilient fingers in order to move the tool longitudinally outwardly from the collet thereby compensating for wear of the cutting portion of the cutting tool.

These and further objects will become more readily apparent upon a reading of the specification when taken in connection with the accompanying sheets of drawings.

In the drawings:

Fig. 1 is a partial view of a boring bar assembly. The view having portions broken away to show a pair of tool holding collets positioned in the operating position on the boring bar.

Fig. 2 is an exploded view of a tool holding collet and its associated part, the parts being arranged in position of their assembly with respect to the tool holding collet which is shown in section.

Fig. 3 is a sectional view of a portion of a tool holding collet, the view being taken substantially along the line 3—3 of Fig. 1.

Fig. 4 is a bottom view of the tool holding collet.

Referring particularly to Figs. 1 and 2, a boring bar is generally designated by the reference character 10. The boring bar 10 comprises, essentially, a body 11 having a shank portion 12, the shank portion being adapted to engage the chuck of a boring mill (not shown). The boring bar 10 is also provided at its forward end with a cutter head 13, only a portion of this head being shown since it forms no part of the present invention.

The boring bar 10 may generally be of conventional construction. The type of bar which is shown being a multiple cutting bar in that provisions are made to hold a number of tool holding collets. The tool holding collets which are shown assembled on the boring bar 10 vary somewhat in size depending on the size of the tool which is held in the collet. For the purpose of the present disclosure, the same reference characters will be applied to all of the collets shown since the same essential elements and patentable features are present in all of the collets.

The body 11 of the boring bar 10 is provided with a plurality of conical openings 14. The openings 14 extend through the body 11, and as shown in Fig. 1, these openings 14 may be positioned at various angles depending on the cut which is to be made.

The tool collet 15 with which the present invention is concerned consists generally of a body 17 which is provided at one end with a shank portion 18. The shank portion 18 is exteriorally threaded. The body 17 is longitudinally slotted to provide a plurality of collet fingers 20. The collet fingers 20 are of a resilient construction and the outer surfaces of the collet fingers 20 are shaped to provide a tapered or conical surface 21. The tapered or conical surface 21 is adapted to mate or to conform to the conical bore 14 provided in the boring bar 10.

As best indicated in Fig. 1, a cutting tool 22 is positioned or inserted between the resilient collet fingers 20. The cutting tool is provided with a suitable cutting edge or surface for operating upon the metal to be cut. Referring again to Fig. 2, the threaded shank 18 is provided with a longitudinally extending threaded bore 23 in which a stud 24 is threaded. The stud 24 may also be considered as a thrust member and consists of a tool holding recess 25 at one end and a tool engaging projection 26 at the other end. A nut 27 is threaded on the exteriorly threaded surface of the shank 18.

In the use and assembly of the tool collet 16 the following steps take place. As best shown in Fig. 2, when the collet fingers 20 are in the relaxed position they are rather widely flared and the cutting tool 22 may be easily inserted between said fingers. Before the cutting tool 22, however, is inserted in between the collet fingers 20, the collet will be placed in the conical bore 14 of the boring bar 10. Since the conical bore 14 extends completely through the body 11, the shank 18 of the tool collet will project outwardly from one end of the bore 14. The adjusting stud 24 has been screwed into place within the threaded bore 23. The projection 26 acts as an adjusting gauge and the threaded plug 24 is screwed to a position within the bore 23 whereupon the tool 22 is inserted between the fingers 20.

After the tool 22 has been thus positioned between the fingers 20, a nut 27 is screwed over the exteriorly threaded shank 18. The nut 27 is screwed to a position, as best shown in Fig. 1, wherein the nut 27 engages a flat shoulder surface 28 positioned adjacent the conical bore 14. As the nut 27 is tightened, the collet 15 will be moved longitudinally into the bore 14. As the collet 15 is drawn further into the bore 14 the fingers 20 are forced against the sides of the conical bore 14 thereby forcing the fingers inwardly into tight gripping engagement with respect to the tool holder 22. It can now be seen that the cutting tool 22 is tightly held within the collet 15 and on the boring bar 10.

The principal advantage of this novel collet design 15 is the ease of adjusting the cutting tool 22 to compensate for wear of its cutting point. As the cutting point wears away adjustment of the cutting tool is made by simply inserting a wrench within the tool receiving recess or socket 25 and the stud 24 is turned. By rotating the stud 25 the cutting tool 22 is advanced in a direction outwardly from the boring bar to the desired projection for engagement with the work. After the cutting tool has been thus advanced the wrench is removed and the operation of the tool may continue.

By this novel and easy construction, adjustment of the cutting tools may quickly be made without time consuming operation. It can be appreciated that in multiple boring bar assemblies wherein a variety of shapes and number of tool collets are utilized it is exceedingly desirable to provide an adjustment for each of the tool holding collets so that the cutting tools may be adjusted quickly and accurately within a minimum of time. By the novel arrangement and improvements shown, such adjustment is quickly made and thus the objects of the invention are readily accomplished.

It must be understood that changes and modifications may be made in the tool collet disclosed without departing from the spirit of the invention as shown, or the scope thereof as defined in the appended claim.

What is claimed is:

In a tool holder having a bar provided with a conical bore extending substantially laterally through the bar, said bar having a shoulder portion concentric with said bore and recessed in the peripheral surface of said bar a tool collet adapted to be secured within said bore, said collet including a shank and a hollow body, said shank having an externally threaded portion and being provided with a threaded bore extending through said shank, said body having an outer tapering surface and being longitudinally split to provide resilient tool engaging collet fingers adapted to receive and clamp a tool therebetween, a nut threaded on the externally threaded portion of the shank and seated in engagement with the shoulder portion, said nut being rotatable with respect to said shank for moving said collet longitudinally within the bore of the tool holder whereby the collet fingers are moved inwardly for clamping a tool disposed between said fingers, and a threaded thrust member disposed within the bore of said shank, said thrust member having a tool receiving recessed portion at one end normally disposed below the peripheral surface of said bar and being rotatable within the threaded bore into engagement with a tool secured between the collet fingers whereby a tool may be longitudinally adjusted with respect to said collet.

ROY W. BOYD, Jr.

References Cited in the file of this patent

UNITED STATES PATENTS

| Number | Name | Date |
| --- | --- | --- |
| 374,743 | Jones | Dec. 13, 1887 |
| 388,573 | Moseley | Aug. 28, 1888 |
| 1,231,347 | Heiser | June 26, 1917 |
| 1,278,427 | Bocorselski | Sept. 10, 1918 |
| 1,438,391 | Nutter | Dec. 12, 1922 |
| 1,698,861 | Wadell | Jan. 15, 1929 |
| 1,765,362 | Berry | June 24, 1930 |
| 2,108,699 | Walther | Feb. 15, 1938 |
| 2,359,210 | Engel | Sept. 26, 1944 |
| 2,537,517 | DeVlieg | Jan. 9, 1951 |